US00RE34772E

United States Patent [19]

Bernard et al.

[11] E Patent Number: Re. 34,772

[45] Reissued Date of Patent: Nov. 1, 1994

[54] VOLTAGE GENERATOR FOR GENERATING A STABLE VOLTAGE INDEPENDENT OF VARIATIONS IN THE AMBIENT TEMPERATURE AND OF VARIATIONS IN THE SUPPLY VOLTAGE

[75] Inventors: Patrick Bernard, Eybens; Christophe Magnier, Coublevie, both of France

[73] Assignee: SGS-Thomson Microelectronics, S.A., Gentilly, France

[21] Appl. No.: 59,825

[22] Filed: May 7, 1993

Related U.S. Patent Documents

Reissue of:

[64] Patent No.: 5,030,903
Issued: Jul. 9, 1991
Appl. No.: 463,616
Filed: Jan. 11, 1990

[30] Foreign Application Priority Data

Jan. 11, 1989 [FR] France ..... 89 00274

[51] Int. Cl.[5] ..... G05F 3/26

[52] U.S. Cl. ..... 323/313; 323/315; 323/901; 323/907

[58] Field of Search ..... 323/313, 314, 315, 316, 323/901, 907, 299; G05F 3/24, 3/26, 3/28, 3/30

[56] References Cited

U.S. PATENT DOCUMENTS 3,940,760 2/1976 Brokaw .
4,029,974 6/1977 Brokaw ..... 307/110
4,063,149 12/1977 Crowle .

FOREIGN PATENT DOCUMENTS 2301862 2/1976 France ..... G05F 1/10
2140692 5/1972 Germany .
182723 7/1988 Japan ..... G05F 3/30
370514 12/1988 Japan ..... G05F 3/26
44516 2/1989 Japan ..... G05F 3/26

OTHER PUBLICATIONS

"Line Voltage Rejection in a Bandgap Voltage Reference," IBM Tech. Discl. Bul., vol. 30, No. 4, pp. 1424–1425, Sep. 1987.

IEE Proceedings, Sec. A a I, vol. 131, No. 6, Dec. 1984, Stevenage, GB, pp. 242–244, R. W. Barker; "Low--Voltage Rail-Supply-Insensitive PTAT Current Generator".

*Primary Examiner*—Jeffrey L. Sterrett
*Attorney, Agent, or Firm*—Richard A. Bachand; Lisa K. Jorgenson; Richard K. Robinson

[57] ABSTRACT

A stable reference voltage generator using a current mirror circuit comprising a primary branch and a secondary branch, is shown and described. A first bipolar transistor (Q1) has its collector connected in series with the primary branch of the current mirror, and a voltage divider bridge comprising at least two series-connected resistors (R1, R2), is connected in series between the secondary branch of the current mirror and the collector of a second bipolar transistor (Q2). The base of the second transistor (Q2) is connected to the common point of the series resistors, the base of the first transistor (Q1) is connected to the collector of the second transistor (Q2), and the output of the generator ($V_{REF}$) is connected to the terminal of the bridge opposite that connected to the collector of the second transistor ($Q_2$). The geometry of said transistors being such that the first transistor (Q1) is equivalent to "N" transistors identical to the second transistor (Q2) connected in parallel. An isolation bipolar transistor (Q7) is connected in series between the primary branch of the current mirror circuit and the first transistor, the collector of the latter being connect to the emitter of the isolation transistor.

18 Claims, 2 Drawing Sheets

VOLTAGE GENERATOR FOR GENERATING A STABLE VOLTAGE INDEPENDENT OF VARIATIONS IN THE AMBIENT TEMPERATURE AND OF VARIATIONS IN THE SUPPLY VOLTAGE

Matter enclosed in heavy brackets [ ] appears in the original patent but forms no part of this reissue specification; matter printed in italics indicates the additions made by reissue.

The present invention concerns a voltage generator able to generate a reference voltage $V_{REF}$ which is independent of variations in ambient temperature and variations in the supply voltage to the generator.

There is known in the prior art the theoretical circuit of a stable voltage generator that is, in theory at least, temperature-independent. FIG. 1 shows a circuit of this kind.

The generator 10 shown there comprises, disposed between a supply voltage $V_{DD}$ and an earth connection:

a current mirror circuit conventionally comprising a primary branch 11 and a secondary branch 12. In the circuit shown the current mirror comprises two PMOS transistors M1 and M2, the source-drain circuit of the transistor M2 here constituting the primary branch 11 while the source-drain circuit of the transistor M1 constitutes the secondary branch 12. The grids of the transistors M1 and M2 are connected together and to the drain of the transistor M2.

A first bipolar transistor Q1 with its collector connected in series with the primary branch 11 of the current mirror. In the circuit shown the transistor Q1 is an NPN transistor with its emitter earthed.

A voltage divider bridge here comprising two resistors R1 and R2 disposed in series, the bridge being itself disposed in series between the secondary branch 12 of the current mirror and the collector of a second bipolar transistor Q2. Here the second transistor is also an NPN transistor and its emitter is earthed while its base is connected to the common point of the resistors R1, R2.

The geometry of the transistors Q1, Q2 is such that the first transistor Q1 is equivalent to "N" transistors identical to the second transistor Q2 connected in parallel. The output 10 of the circuit, at which the reference voltage $V_{REF}$ is obtained, is at the point where the resistor R2 is obtained, is at the point where the resistor R2 is connected to the drain of the transistor M1.

A circuit of this kind is used to generate a reference voltage $V_{REF}$ which is stable relative to variations in ambient temperature provided that the values of R1, R2 and N are carefully chosen. As is known, if the arrangement is such that the transistor M1 is turned on (saturated) the circuit constituted by the transistors M1 and M2 is a current mirror, the current flowing in the secondary branch 12 having characteristics very similar to those of the current flowing in the primary branch 11. Neglecting the base currents of the transistors Q1 and Q2, current of comparable characteristics flows through the transistor Q1, on the one hand, and the combination of the resistor bridge R1, R2 and transistor Q2, on the other hand. As is also known, there is an exponential relation between the current and the base-emitter voltage in a bipolar transistor. As the design of the transistor Q1 is such that it is equivalent to N transistors Q2 connected in parallel and as it is known that the differences between the base-emitter voltages of two bipolar transistors of different geometry but with the same current passing through them is proportional to ambient temperature, as expressed by the following equation:

$$V_{BE2} - V_{BE1} = \mathrm{Log}N \cdot kT/q \quad (1)$$

in which "k" and "q" are universal constants well known to those skilled in the art and $V_{BE1}$ and $V_{BE2}$ are the base-emitter voltages of transistors Q1 and Q2.

Neglecting the base currents, the resistors R1 and R2 are regarded as carrying the same current. Consequently:

$$V_{REF} V_{BE2} - (V_{BE2} - V_{BE1}) \cdot R2/R1 \quad (2)$$

Furthermore, it is known that, neglecting other than first order terms, the base-emitter voltage decreases in linear relationship to temperature. It follows that the base-emitter voltage ($V_{BE2}$) of the transistor Q2 is given by the equation:

$$V_{BE2} = V_{CO2} + \alpha T \quad (3)$$

in which $\alpha$ and $V_{CO2}$ are constants related to the design of the transistor Q2. This equation ignores higher order terms in T and the very small variations in $V_{CO2}$ as a function of the current through the transistor.

The following equation is derived from the above three equations:

$$V_{REF} = V_{CO2} + \alpha T - \frac{R2}{R1} \frac{kT}{Q} \mathrm{Log}N \quad (4)$$

It follows that by choosing carefully R1, R2 and N it is possible in equation (4) above to eliminate the sum of the first order terms T.

The output voltage $V_{REF}$ of the circuit is then dependent only on the constant component $V_{CO}$ of the base-emitter voltage of the transistor Q2.

This circuit is generally satisfactory in that it eliminates the effects of variations in ambient temperature. Variations of the second ($T^2$) and higher orders are negligible in most applications and it has been shown above that the FIG. 1 circuit can eliminate the effects of first order variations in temperature. This circuit is highly sensitive to variations in the supply voltage $V_{DD}$, however.

If the supply voltage $V_{DD}$ increases the voltage at the drain of M2 follows the variation in $V_{DD}$ closely whereas the voltage at the drain of M1 remains relatively stable. The transistors M1 and M2 are turned on and it is therefore known that the drain-source current through them is likely to vary as a function of the drain-source voltage with a relatively shallow but non-null slope. As the drain-source voltages of the transistors M1 and M2 diverge, the latter carry substantially different amplitude currents: the basic hypothesis whereby the bipolar transistors Q1 and Q2 carry exactly the same currents is therefore falsified immediately the supply voltage $V_{DD}$ varies.

Similarly, considering the bipolar transistors, note that the transistor Q2 has a relatively stable collector voltage (it is equal to the base-emitter voltage of the transistor Q1) whereas the voltage at the collector of the transistor Q1 follows to a greater or lesser degree the variations in the supply voltage $V_{DD}$ because of the transparency of the transistor M2 in this regard. Under these conditions the Early effect (modulation of the width of the base of a bipolar transistor as a function of the collector-base voltage) results in deviations in the difference between the base-emitter voltages of the transistors Q1, Q2 ($V_{BE2}-V_{BE1}$) relative to its above theoretical value.

An object of the present invention is a voltage generator operating on broadly the same principle as that shown in FIG. 1 but in which variations in the output voltage of the current mirror circuit have little or no effect on the voltage at the collector of the first and second transistors (Q1 and Q2) are maintained equal to the greatest possible extent.

Thus in accordance with one aspect of the present invention the generator, which has a general structure substantially conforming to what has been described hereinabove, is characterised in that it further comprises an isolating transistor disposed in series between the primary branch of the current mirror circuit and the first transistor, the collector of the latter being connected to the emitter of the isolation transistor, and means supplying to the base of the isolation transistor a voltage predetermined to enable conduction in said isolation transistor.

By virtue of these arrangements any variations in the output voltage of the primary branch of the current mirror circuit are prevented from being passed on to the collector of the first transistor. As the voltage fed to the base of the isolation transistor is predetermined and as this transistor has its emitter connected to the collector of the first transistor, the potential at the collector of the first transistor is stable.

In accordance with another characteristic of the invention, the current mirror circuit comprises at least two cascade transistor stages.

By virtue of this provision the voltage generator comprises a voltage mirror whose performance is significantly better than that of the voltage mirror constituted by the PMOS transistors M1 and M2 described in relation to FIG. 1. It follows that if the supply voltage $V_{DD}$ varies the current flowing in the secondary branch continues to reflect that flowing in the primary branch. Thanks to this characteristic the sum of the first order factors in T in equation (4) above is effectively null because the original hypothesis (equality of the currents flowing in the first transistor Q1 and the second transistor Q2) is complied with.

The Applicant has also found himself faced with the problem of starting up the generator as briefly described above on switching on. This is because a generator of this kind has a second stable state in which all the transistors are turned off.

The present invention provides for adding to the circuit briefly described hereinabove starting means for going from the stable state in which all the transistors are turned off to that in which all the transistors are turned on.

According to one aspect of the present invention these means comprise one or more starter capacitors adapted to cause conduction in the current mirror circuit and therefore in the other transistors.

Starter capacitors may have disadvantages in some applications and, in accordance with another aspect of the invention, the need for them is avoided by the provision of starting means comprising a so-called "starter" field-effect transistor adapted to cause conduction in the transistors of the current mirror circuit and an inverter circuit adapted to drive the starter field-effect transistor so that it is turned off when the generator has gone to its stable state in which all the bipolar transistors are turned on.

The characteristics and advantages of the present invention will emerge from the following description with reference to the appended drawings, in which:

FIG. 1 has already been described,

In the drawings components common to more than one figure retain the same reference numbers.

FIG. 2 shows a circuit that will be recognised as similar to that of FIG. 1. As compared with the latter, the following differences apply:

Figure 1:
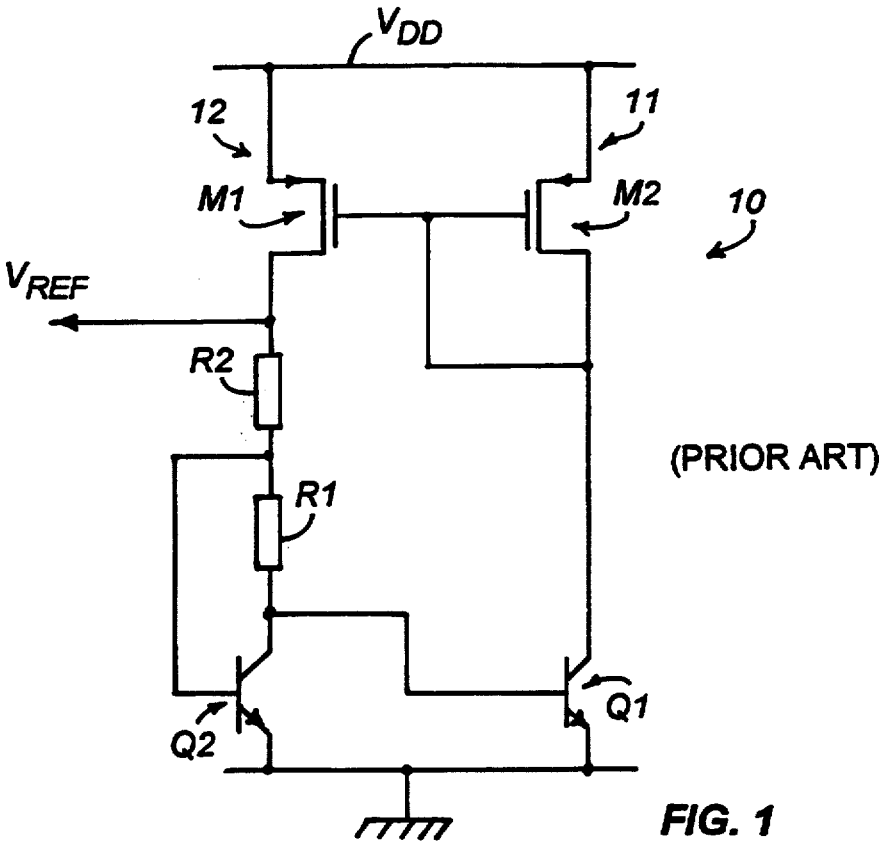

The current mirror constituted in FIG. 1 by the PMOS transistors M1, M2 is replaced in accordance with one aspect of the invention by a Wilson type cascode current mirror using bipolar transistors Q3–Q6. This mirror is of the Wilson type because in the primary branch, here constituted by the transistors [Q4–Q6] *Q4, Q6*, the base of the output transistor (Q6) is connected to the collector of this transistor, while in the secondary branch, constituted in this instance by the transistors Q3, Q5, it is the base of the transistor connected to the $V_{DD}$ supply that is connected to the collector of this transistor; also, the base of the transistor Q3 is connected to that of the transistor Q4 while the base of the transistor Q5 is connected to that of the transistor Q6.

In accordance with another aspect of the invention, an isolation transistor Q7 is disposed in series between the primary branch 11 of the current mirror circuit and the first transistor Q1, the collector of the transistor Q1 being connected to the emitter of the isolation transistor Q7. Observe that the collector of the isolation transistor Q7 is connected to the output of the primary branch of the current mirror circuit, in this instance the collector of the transistor Q6. Means are provided for supplying to the base of the isolation transistor a voltage predetermined to enable conduction in the isolation transistor Q7. For the embodiment shown these supply means comprise a voltage source $V_{TH}$ of which one embodiment will be described with reference to FIG. 3.

In accordance with another aspect of the invention, a so-called starter capacitor C1 is connected between the collector of the transistor Q7 and earth.

The circuit shown in FIG. 2 operates in the following manner:

As is known, an arrangement of transistors such as the system Q3–Q6 operates as an accurate current mirror circuit, the current flowing in the secondary branch consisting of the transistors Q3, Q5 reflecting that flowing in the primary branch consisting of the transistors Q4, Q6. However, differing in this from the current mirror circuit shown in FIG. 1, the current mirror circuit constituted by the transistors Q3–Q6 is not subject to any significant differences between the amplitudes of the currents flowing in its primary branch and in its secondary branch should the supply voltage $V_{DD}$ vary.

As the arrangement is such that the transistor Q7 is turned on, it follows that the current flowing in the first transistor Q1 is identical to that flowing in the transistor Q2, ignoring the base currents. This characteristic contributes to enabling the stable reference voltage generator to operate in accordance with the theory outlined hereinabove.

Figure 2:
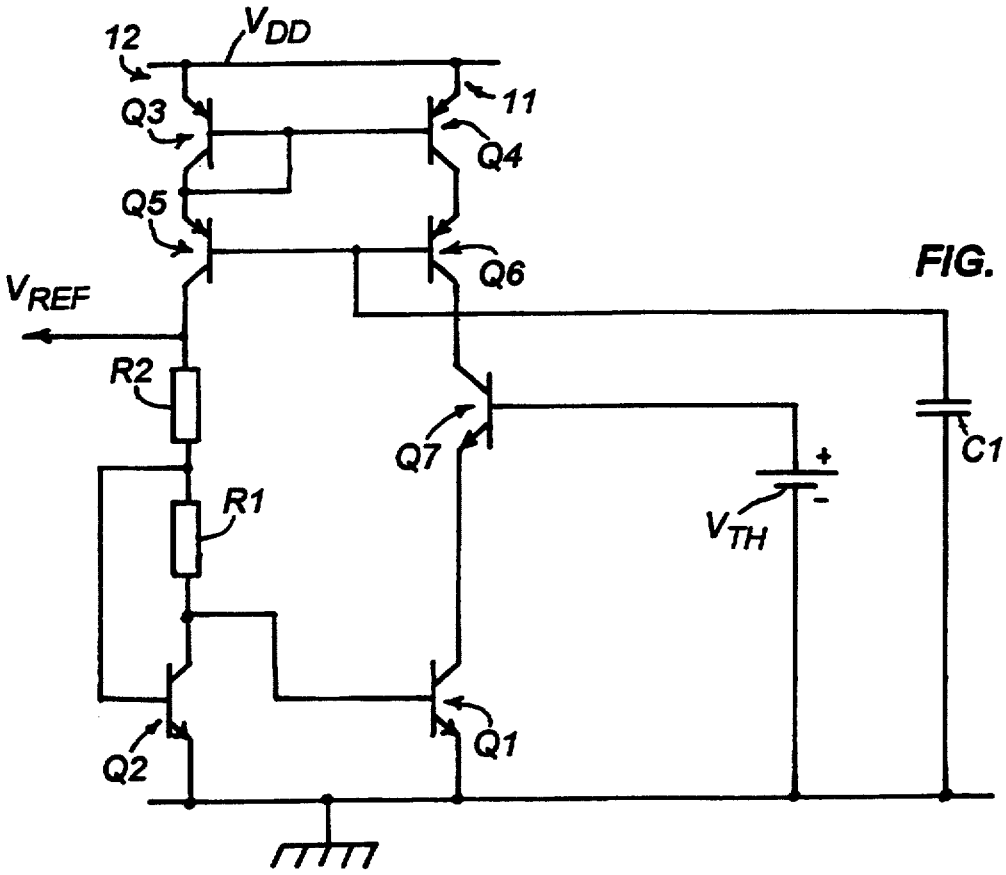
FIG. 2 is a simplified diagram showing one embodiment of the present invention.

Moreover, the presence of an isolation transistor in accordance with the invention such as the transistor Q7 in conjunction with the Wilson type mirror used in the FIG. 2 circuit guarantees compliance with the theoretical operating conditions (equal currents) by isolating the collector of the first transistor Q1 from variations in the voltage at the collector of the transistor Q6.

Should the supply voltage $V_{DD}$ vary the potential at the transistor Q6 also varies. However, no such variation can be passed on as such to the collector of the first transistors Q1 because the transistor Q7 functions as an isolating means. The potential $V_{th}$ applied to the base of the transistor Q7 is relatively stable and sufficient to enable Q7 to turn on (means for obtaining the potential $V_{TH}$ will be described with reference to FIG. 3); the same therefore applies to the potential at the emitter of the transistor Q7: as is known, in a bipolar transistor the emitter potential is 0.6 V lower than the base potential when the transistor is turned on.

It is therefore possible to guarantee that the potential at the collector of Q1 will be 0.6 V below the potential $V_{TH}$: this eliminates the effects of variations in the voltage at the collector of the transistor Q6 at the output of the primary branch of the current mirror circuit, any such variations being absorbed by the isolation transistor Q7.

Figure 3:
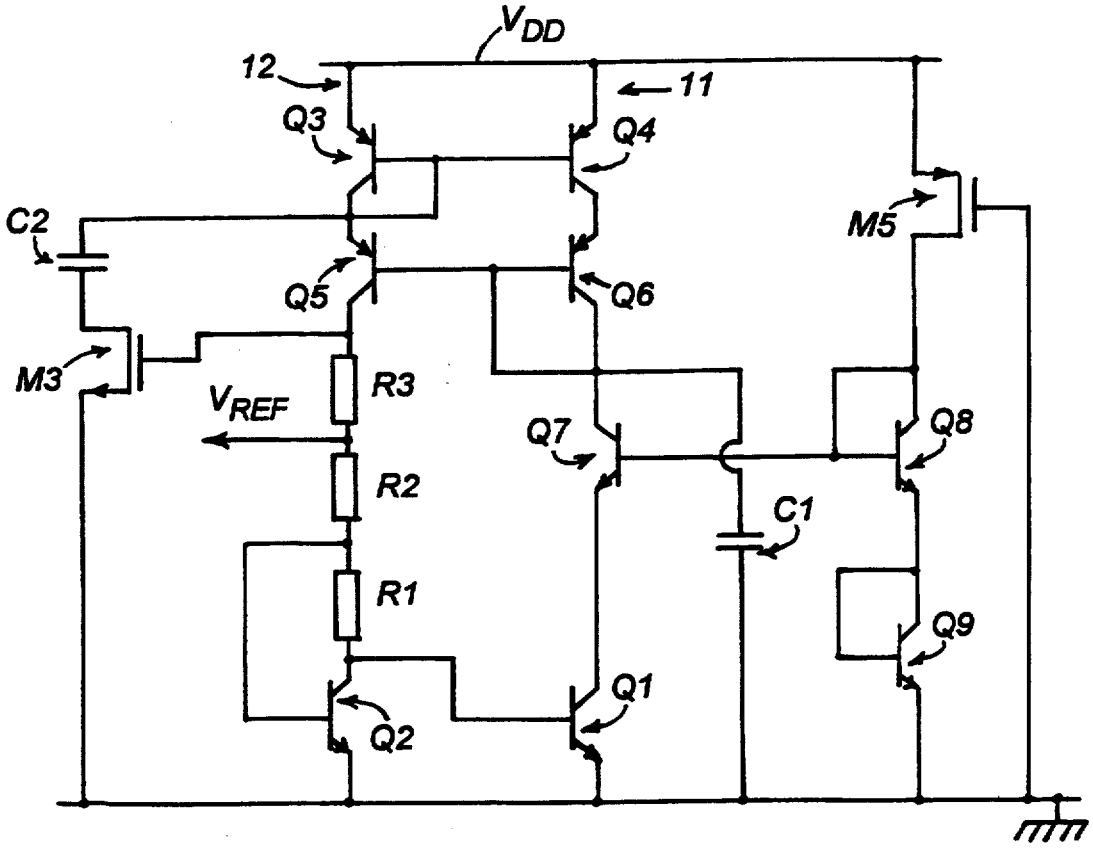
FIG. 3 is a more complicated diagram showing various means not shown in FIG. 2.

FIG. 3 shows one embodiment of the source of the voltage $V_{TH}$ to be connected to the base of the isolation transistor Q7.

The voltage $V_{TH}$ may be in the order of 1 V to 1.5 V to guarantee operation of the circuit with 3 V supply voltages.

The voltage is obtained by connecting two NPN bipolar transistors Q8 and Q9 in series. The transistors are adapted to be turned on (base connected to collector). The potential at the base of the transistor Q8 is therefore twice the bases-emitter voltage in a saturated bipolar transistor, that is 1.2 V. A PMOS transistor M4 is provided between the collector of Q8 and the $V_{DD}$ supply, its grid being earthed so that it functions as a resistor.

The voltage $V_{TH}$ at the base of Q7 is therefore 1.2 V and does not vary significantly. As is known, if the collector current of the transistors Q8 and Q9 is caused to vary by a substantial variation in the voltage $V_{DD}$ the base-emitter voltage of the transistors Q8 and Q9 will not vary significantly: it follows that the voltage $V_{TH}$ is relatively stable, in any event sufficiently so to avoid excessive amplitude variations at the collector of the transistor Q1.

As an alternative to this, the FET transistor M4 may be replaced by a resistor. As a further alternative, the voltage $V_{TH}$ can be obtained by means of a circuit such as that shown in FIG. 1.

The role of the capacitor C1 (FIG. 2) is as follows. Like most stable reference voltage generators using bipolar transistors, the FIG. 2 circuit has one stable state in which all the transistors are turned on and a second stable state in which all the transistors are turned off. Before the voltage generator is switched on all the transistors are turned off and as a stable state there is no reason for the circuit as a whole to change to the first stable state in which all the transistors are turned on. The Applicant has looked for a way to enable the circuit to go from the stable state in which all the transistors are turned off to the stable state in which all the transistors are turned on.

According to one characteristic of the present invention this problem is overcome by inserting the starter capacitor C1 between the collector of the transistor Q7 and earth.

This capacitor operates as means for changing the remainder of the circuit from the turned off stable state to the stable state in which all the transistors are turned on. When the circuit is started the transistor Q6 is turned off and tends to remain turned off because all of the circuit is in the turned off stable state. For the transistor Q6 to remain in a turned off stable state its base must be held at a potential near $V_{DD}$, making it necessary to charge the starter capacitor C1, as this is also connected to the base of the transistor Q6. However, to supply the necessary charge Q6 must turn on. The same then applies to the transistor Q4. The current mirror circuit then begins to operate which leads to the transistors Q3, Q5 and then the transistors Q1 and Q2 being turned on. The entire circuit then switches over to the stable state in which all the transistors are turned on.

In practice the capacitor C1 must be chosen with a sufficiently high value. In the preferred embodiment of the present invention a capacitor C1 with a value of 3 pF is used.

What has been described above is valid for slow variations in the supply voltage $V_{DD}$ but in some cases, in particular in the case of sudden and fast variations in the supply voltage $V_{DD}$, the FIG. 2 circuit does not operate satisfactorily.

For fast increases in the supply voltage $V_{DD}$ (due to high-frequency interference, for example) the base-emitter voltage of the transistors Q3 and Q4 increases suddenly in absolute value, so leading to an increase in the current in the two branches of the current mirror circuit consisting of the transistors Q3–Q6. However, even if the current variations remain exactly the same in the two branches, as downstream of the primary branch there are connected in parallel, on the one hand a circuit branch comprising, connected in series, the transistors Q7 and Q1 and, on the other hand, the capacitor C1, some of the current flowing in the primary branch of the current mirror circuit is diverted to C1 which leads to an imbalance in the currents flowing in the transistors Q1 and Q2, respectively. Given these conditions, the original hypothesis (equal currents in Q1 and Q2) is no longer complied with, which leads to a sudden variation in the reference voltage at the output of the circuit ($V_{REF}$). What is more, the lack of symmetry of currents through Q1 and Q2 applies for as long as capacitor C1 is not charged with the result that in some applications the time needed for the reference voltage at the circuit output ($V_{REF}$) to return to the required level is unacceptably long. To remedy this disadvantage the inventor has had the idea of providing a second capacitor C2 of the same value as C1 between the collector Q3 and earth, so that the current symmetry is retained at the transistors Q1 and Q2 even in the presence of sudden variations in the supply voltage $V_{DD}$. This characteristic of the invention is shown in FIG. 3.

Observe that a capacitor C2 is connected to the collector of the bipolar transistor Q3 of the secondary branch of the current mirror. This capacitor is earthed through an NMOS transistor M3. The grid of this transistor is connected to the collector of the second bipolar transistor Q5 of the secondary current mirror circuit.

When the transistor M3 is turned on the capacitor C2 is earthed for reasons that will be explained later. Even in the presence of sudden variations in the supply voltage $V_{DD}$ the capacitors C1 and C2 will be charged symmetrically which guarantees equal currents through the bipolar transistors Q1 and Q2.

The role of the field-effect transistor M3 is as follows. The capacitor C2 would represent a disadvantage in the absence of this transistor and if it were therefore connected directly to earth: it would prevent correct starting of the circuit on switching on because it would absorb all of the current flowing through the transistor Q3, preventing the transistor Q2 turning on. Under these circumstances the entire circuit would eventually find itself again in the stable state in which all the transistors are turned off. The inventor has found that it is necessary to inhibit the capacitor C2 when the second bipolar transistor Q2 is not turned on: this is the role of the NMOS transistor M3.

If the bipolar transistor Q2 is not turned on the grid potential of the NMOS transistor M3 remains near zero volts and this transistor is therefore turned off: under these conditions the capacitor C2 is not earthed. After starting, when the supply voltage $V_{DD}$ reaches a specific potential the transistors Q2 and M3 turn on and the capacitor C2 is earthed enabling the circuit to absorb any subsequent variations in the supply voltage $V_{DD}$ and preventing such variations having any effect on the output voltage $V_{REF}$.

The role of the resistor R3 is to increase slightly the grid potential of the transistor M1 to ensure that the latter turns on after starting.

Another starting problem can arise if the load connected to the $V_{REF}$ output is capacitative and in the same order of magnitude as the capacitor C1. The capacitance represented by the load is earthed directly and during starting it absorbs all of the current flowing through the secondary branch Q3–Q5 of the current mirror circuit, preventing the transistor Q2 turning on. To remedy this disadvantage it is sufficient to choose sufficiently high values for C1 and C2, always greater than that of the intended load, to protect against starting problems.

The circuit shown in FIG. 3 provides a gain in the order of 20 dB at the circuit output ($V_{REF}$) in respect of filtering variations in the supply voltage $V_{DD}$ for frequencies from 100 kHz up to a few MHz.

Figure 4:
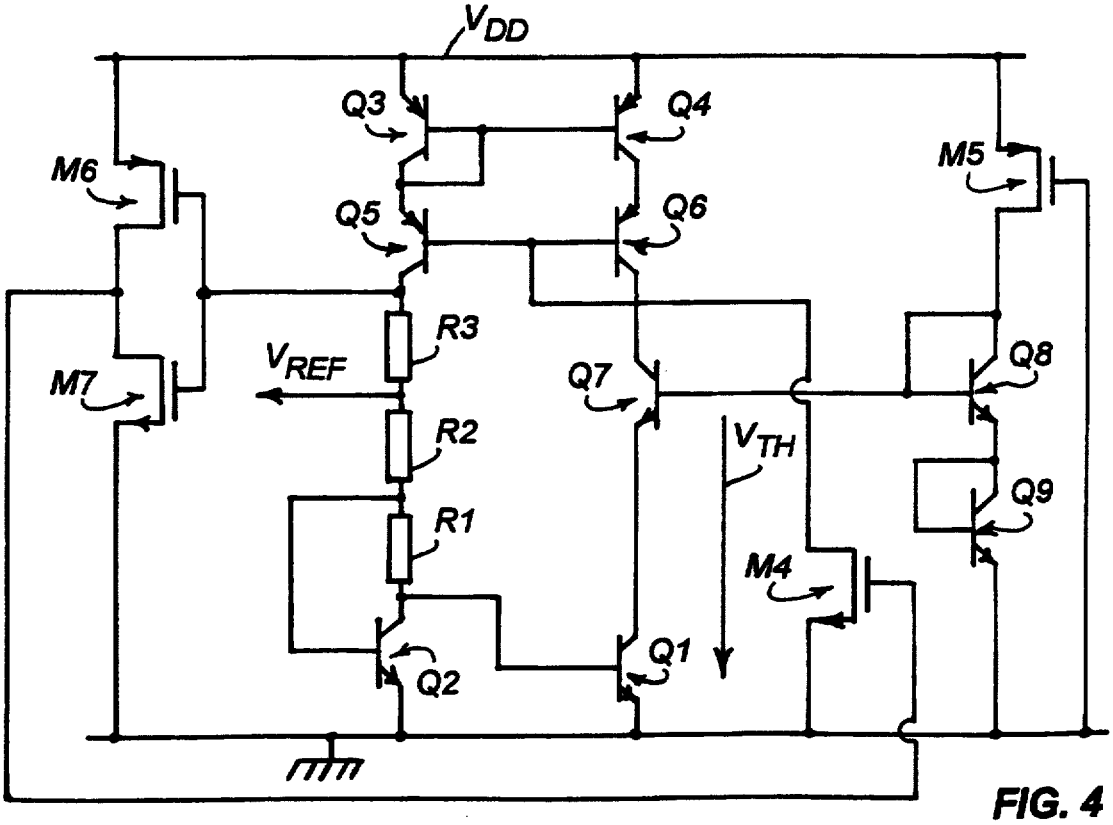
FIG. 4 shows an alternative embodiment of the circuit shown in FIG. 3.

In some high-frequency applications, or for other reasons, it may be beneficial to provide a circuit without starter capacitors such as the capacitors C1 and C2 but having supply variation filtering performance comparable with that of the circuit of FIG. 3. The circuit shown in FIG. 4 resolves this problem.

Here the capacitor C1 is replaced by a PMOS transistor M4 the grid of which is connected to the output S of an inverter comprising a PMOS transistor M6 and an NMOS transistor M7. The source of the transistor M6 is connected to the $V_{DD}$ supply while that of the transistor M7 is connected to earth. The input E of the inverter (consisting of the interconnected grids and the transistor M6–M7) is connected to the collector of the transistor Q5.

This circuit operates in the following manner.

Conventionally, provided that the voltage at the input E of the inverter is below a specific threshold the output S of the inverter is at the same potential ($V_{DD}$ in this instance) as the source of the PMOS transistor M6 which is then turned on. It follows that the grid of the transistor M4 is at the potential $V_{DD}$ and the NMOS transistor M4 turns on when the generator is started. Under these conditions the transistor M4 imposes a current in the primary branch of the current mirror circuit which makes it possible to turn on all the other bipolar transistors.

However, the potential at the collector of the transistor Q5 increases and when the inverter threshold is exceeded, the transistor M6 turns off while the transistor M7 turns on: the output S of the inverter is then connected to earth as is the grid of the transistor M4, which turns off: all of the current flowing in the primary branch of the current mirror circuit is then passed through the transistor Q1. As the grid currents of the transistors M6 and M7 are negligible all of the current flowing in the secondary branch of the current mirror circuit is routed towards Q2: the equality of the currents in the transistors Q1 and Q2 is complied with and the circuit then generates a stable reference voltage that is independent of temperature and variations in the supply voltage $V_{DD}$ for the reasons explained above.

Thus, by replacing the capacitors C1 and C2 in the FIG. 3 circuit with various field-effect transistors it is possible to circumvent the disadvantages associated with any high-frequency signals present on the $V_{DD}$ supply rail.

Of course, the present invention is in no way limited to the selected embodiments shown by encompasses any variation within the competence of those skilled in the art. In particular, it is in no way limited to the use of the Wilson circuit as the current mirror circuit.

We claim:

1. [Stable] *A stable* reference voltage generator [comprising, disposed] *for connection* between a voltage supply [($V_{DD}$)] and [an earth connection,] *a ground potential, comprising:* a reference voltage generating section including:

a current mirror circuit comprising a primary branch and a secondary branch which, in operation, carries a current with characteristics at least comparable with [, and if possible identical to,] those of the current in the primary branch[,]*;* a first [bipolar] transistor [(Q1) with its collector connected] in series with the primary branch of the current mirror[,]*;*

*an isolation transistor in series between the primary branch of the current mirror circuit and the first transistor;* a voltage divider [bridge] comprising [at least] two [series-connected] resistors [(R1, R2) said bridge being connected in series between the secondary branch of the current mirror and the collector of] *interconnected at a common point;* a second [bipolar] transistor [(Q2), the base of the second transistor (Q2) being] *in series between the resistors and the ground potential, and having a current control element* connected to the common point of said resistors, [the base] *a current control element* of the first transistor [(Q1)] being connected to [the collector of] *a node between* the second transistor [(Q2), the] *and the resistors; said voltage divider being connected in series between the secondary branch of the current mirror circuit and the second transistor;*

*an* output of the *reference voltage* generator [($V_{REF}$)] being [connected to the terminal] derived from one of the [bridge opposite that connected to the collector of] *resistors with respect* the second transistor [(Q2), the geometry of said transistors being such that the first transistor (Q1) is equivalent to "N" transistors identical to the second transistor (Q20) connected in parallel, the reference voltage ($V_{REF}$) being given by the equation:

$$V_{REF} = V_{BE2} + \frac{R2}{R1} \frac{kT}{q} \text{Log}N$$

in which:

T: Ambient temperature $V_{BE2}$: Base-emitter voltage of the second transistor (Q2), in turn given (neglecting other than first order terms) by the equation:

$$V_{BE2} = V_{CO2} + \alpha T$$

in which $\alpha$ and $V_{CO2}$ are constants related to the design of the second transistor R1: Value of the resistor of the bridge connected to the collector of the second transistor (Q2)

R2: Value of the second resistor of the bridge connected in series with R1 k,q: Universal constants R1, R2 and N being chosen so that the sum of the terms $\alpha T$ and $$\frac{R2}{R1} \frac{kT}{q} \text{Log}N$$

is null, characterised in that it further comprises an isolation bipolar transistor (Q7) connect in series between the primary branch of the current mirror circuit and the first transistor, the collector of the latter being connected to the emitter of the isolation transistor,] and *the characteristics of the first and second transistors and the magnitudes of the first and second resistors having been selected such that a reference voltage provided at the output of the reference voltage generator is substantially independent of variation in ambient temperature; and* means, distinct from said reference voltage generating section, for [feeding to the base of] *biasing* the isolation transistor [a voltage predetermined] to enable conduction in said isolation transistor.

2. [Voltage] *The stable voltage* generator according to claim 1 [characterized in that] *wherein* the current mirror circuit comprises at least two [cascade] *cascode* transistor stages [(Q3, Q4 and Q5, Q6)].

3. [Generator] The reference voltage generator according to claim 1 [characterized in that the transistors are] *wherein the current mirror circuit comprises first, second, third, and fourth* bipolar transistors [in a so-called "Wilson" circuit] in which the base of the [output] *third* transistor [(Q6)] of the primary branch [of the circuit] is connected to [the] *its* collector [of this transistor (Q6) whereas], the base of the *second* transistor [(Q3) connected to the supply voltage of the generator ($V_{DD}$),] *of the secondary branch* is connected to [the] *its* collector, [of this transistor (Q3),] *and* the bases of the *first and second and the third and fourth* transistors of each stage [being] *are* connected together.

4. [Generator] *The reference voltage generator* according to claim 1 [characterised in that it comprises] *further comprising* a starter capacitor [(C1)] between [the collector of] the isolation transistor [(Q7)] and [earth] *ground.*

5. [Generator] *The reference voltage generator* according to claim 4 [characterised in that it comprises] *wherein* a second starter capacitor [(C2)] *is* connected between [the collector of the bipolar transistor connected to the generator supply voltage ($V_{DD}$)] *an internal connection in the secondary branch of said current mirror circuit* and [earth] *ground* through isolating means adapted to isolate the second starter capacitor [(C2)] from [earth] *ground* when the second [bipolar] transistor [(Q2)] is [not turned on] *off.*

6. [Generator] *The reference voltage generator* according to claim 5 [characterised in that] *wherein* said *isolating* means for isolating the second starter capacitor [(C2) comprise] *field-effect transistor* [(M3)] connected in series between said second starter capacitor [(C2)] and [earth] *ground,* the [grid] *gate* of said field-effect transistor being connected to the output of the secondary branch [(12)] of the current mirror *circuit.*

7. [Generator] *The reference voltage generator* according to claim 4 [characterised in that] *wherein* the *current mirror circuit comprises* [transistors are] *first, second, third, and fourth* bipolar transistors [in a so-called "Wilson" circuit] in which the base of the [output] *third* transistor [(Q6)] of the primary branch [of the circuit] is connected to [the] *its* collector [of this transistor (Q6) whereas], the base of the *second* transistor [(Q3) connected to the supply voltage of the generator ($V_{DD}$),] *in the secondary branch* is connected to [the] *its* collector [of the transistor (Q3),], *and* the bases of the *first and second and the third and fourth* transistors [of each stage] being connected together.

8. [Voltage] *The reference voltage* generator according to claim [4 characterised in that] *5 wherein* the current mirror circuit comprises at least two [cascade] *cascode* transistor stages [Q3, Q4 and Q5, Q6)].

9. [Generator] *The reference voltage generator* according to claim 1 [characterised in that it comprises] *further comprising a* starting means *for turning on the transistors of the current mirror circuit, said starting means* comprising [in particular]:

a [so-called "starter" field-effect] *starter* transistor [(M4) adapted] *connected* to turn on the transistors of the current mirror circuit, and an inverter circuit designed to drive the starter field-effect transistor, [in particular] to turn [it] off *said starter transistor* when the *reference voltage* generator has switched to [its] *a* stable state in which all the [bipolar] transistors are turned on.

10. [Generator] *The reference voltage generator* according to claim 9 [characterised in that], *wherein* the inverter circuit comprises:

a PMOS transistor [(M6) the] *having a* source [of which is] connected to said voltage supply [($V_{DD}$)], and an NMOS transistor [(M7) the] *having a* source [of which is] connected to [earth] *ground,*

[the drains of] said *NMOS and PMOS* transistors [being] *having drains* connected together and constituting the output [(S)] of the inverter circuit [and the grids of], *and* said *NMOS and PMOS* transistors [being] *having gates* connected together and constituting [the] *an* input [(E)] of said inverter circuit.

11. [Generator] *The reference voltage generator* according to claim 9 [characterised in that the] *wherein* the [transistors are] *current mirror circuit comprises first, second, third, and fourth* bipolar transistors [in a so-called "Wilson" circuit] in which the base of the [output] *third* transistor [(Q6)] of the primary branch [of the circuit] is connected to [the] *its* collector [of this transistor (Q6) whereas], the base of the *second* transistor [(Q3) connected to the supply voltage of the generator ($V_{DD}$),] *in the secondary branch* is connected to [the] *its* collector [of the transistor (Q3),] the bases of the *first and second and the third and fourth* transistors [of each stage] being connected together.

12. [Voltage] *The reference voltage* generator according to claim 9 [characterised in that] *wherein* the current mirror circuit comprises at least two cascode transistor stages [(Q3, Q4 and Q5, Q6)].

13. [Generator] *The reference voltage generator* according to claim 1 [characterised in that it comprises] *further comprising a starter circuit comprising:* a [so-called "starter"] *starter* field-effect transistor (M4) between the collector of] *connected to* the isolation transistor [(Q7)] and [earth] *ground;* and an inverter circuit between said voltage supply [($V_{DD}$)] and [earth] *ground,* [the] *an* output [(S)] of said inverter circuit being connected to [the grid] *a gate* of the starter transistor [(M4)] and [the] *an* input [(E)] of the inverter circuit being connected to the output of the secondary branch [(12)] of the current mirror circuit.

14. [Generator] *The reference voltage generator* according to claim 13 [characterised in that the transistors are] *wherein the current mirror circuit comprises first, second, third, and fourth* bipolar transistors [in a so-called "Wilson" circuit] in which the base of the [output] *third* transistor [(Q6)] of the primary branch [of the circuit] is connected to [the] *its* collector [of this transistor (Q6) whereas], the base of the *second* transistor [(Q3) connected to the supply voltage of the generator ($V_{DD}$),] *in the secondary branch* is connected to [the] *its* collector [of this transistor (Q3),], *and* the bases of the first and second and the *third and fourth* transistors [of each stage] being connected together.

15. [Voltage] *The reference voltage* generator according to claim 13 [characterised in that] *wherein* the current mirror circuit comprises at least two cascode transistor stages [(Q3, Q4 and Q5, Q6)].

*16. The voltage generator of claim 1 wherein the geometry of said first and second transistors is such that the first transistor is equivalent to "N" transistors identical to the second transistor connected in parallel.*

*17. The reference voltage generator according to claim 16 wherein the magnitudes of the first and second resistors are determined by the following equations:*

$$V_{REF} = V_{BE2}\frac{R2}{R1}\ \frac{kT}{q}\ LogN$$

*in which:*

*T: Ambient temperature*

*$V_{BE2}$: Base-emitter voltage of the second transistor, in turn given (neglecting other than first order terms) by the equation:*

$$V_{BE2} = V_{CO2} + \alpha T$$

*in which $\alpha$ and $V_{CO2}$ are constants related to the design of the second transistor*

*R1: Value of the resistor of the bridge connected to the collector of the second transistor*

*R2: Value of the second resistor of the bridge connected in series with R1*

*k,q: Universal constants R1, R2 and N being chosen so that:*

$$\alpha T + \frac{R2}{R1}\ \frac{kT}{q}\ LogN = 0$$

*18. A reference voltage generator according to claim 1 wherein the first transistor, the second transistor and the isolation transistor are bipolar transistors.*

* * * * *